Oct. 20, 1942.   L. ROSENSTEIN   2,299,427
CHLORINE MANUFACTURE
Filed Dec. 28, 1940
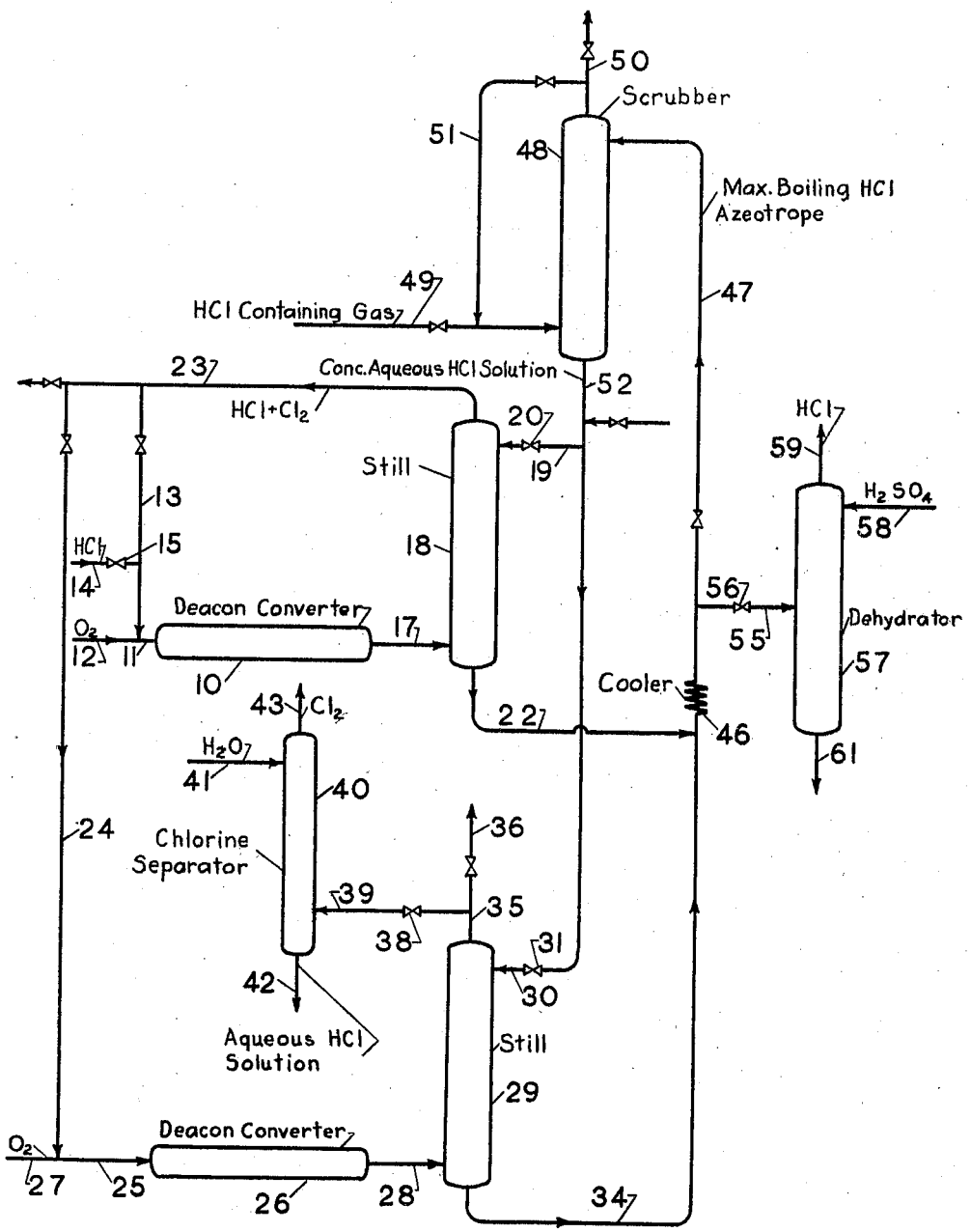
Inventor: Ludwig Rosenstein
By his Attorney:

Patented Oct. 20, 1942

2,299,427

UNITED STATES PATENT OFFICE 2,299,427

CHLORINE MANUFACTURE

Ludwig Rosenstein, San Francisco, Calif., assignor to Shell Development Company, San Francisco, Calif., a corporation of Delaware Application December 28, 1940, Serial No. 372,094

7 Claims. (Cl. 23—219)

The present invention relates to the preparation of free chlorine from hydrogen chloride, and pertains more particularly to an improved method for the continuous production of chlorine by the catalytic oxidation of hydrochloric acid gas. In one of its specific embodiments, the invention covers a continuous process whereby high yields of chlorine may be obtained from the oxidation of hydrogen chloride, especially the hydrogen chloride which is formed as a by-product from various chemical reactions, such as the reactions in which chlorine is reacted, via chlor-substitution, with saturated and/or unsaturated organic compounds, e. g. hydrocarbons, or wherein chlorinated hydrocarbons are subjected to catalytic or non-catalytic, thermal dehydrochlorination to produce unsaturated hydrocarbons.

The reaction involving the oxidation of hydrogen chloride may be generally expressed by the following equation:

$$4HCl + O_2 \rightleftharpoons 2Cl_2 + 2H_2O$$

This reaction has been known for many years and is termed the "Deacon" reaction or process. It is also known that removal of the water formed as a result of the above oxidation of hydrogen chloride will shift the equilibrium to favor greater chlorine formation. Although the catalytic oxidation of hydrogen chloride according to the Deacon process may be effected by using vapors resulting from the vaporization of aqueous hydrochloric acid solutions, the resulting mixtures contain chlorine in a highly diluted state so that the recovery of liquid chlorine therefrom is difficult and uneconomical. On the other hand, in view of a ready market for liquid chlorine, it is highly desirable to employ substantially anhydrous hydrogen chloride gas as the primary material in the Deacon converters so as to decrease the water vapor content of the effluent gases.

There is a number of processes in which the resulting gaseous mixtures consist of or predominate in organic compounds, such as hydrocarbons or their chlorinated derivatives, and hydrogen chloride gas. According to the usual processes, the hydrogen chloride is normally separated from such mixtures by scrubbing with relatively large amounts of water. Therefore, the hydrogen chloride concentration in the resulting aqueous solutions is quite low. When it is desired to utilize the hydrogen chloride of such solutions as the primary material for the production of chlorine, and especially if economical production of liquid chlorine is to be attained, it becomes necessary to pre-treat the aqueous hydrochloric acid to obtain first relatively concentrated solutions and even substantially anhydrous hydrogen chloride. Such pretreatment is costly and cumbersome since it necessitates the handling of relatively large volumes of dilute aqueous hydrochloric acid solutions.

It is, therefore, one of the main objects of this invention to provide a process whereby gaseous mixtures containing hydrogen chloride, as, for example, mixtures obtained during high temperature chlor-substitution reactions, and/or during dehydrochlorination of organic chlorides, may be effectively and economically treated to recover the hydrogen chloride therefrom, and of using this hydrogen chloride as the starting material for the production of free chlorine via oxidation of such hydrogen chloride. Another object of the invention is to afford an economical method whereby substantially all of the hydrogen chloride entering the system, or at least a predominating portion thereof, is oxidized to produce free chlorine.

It is a further object of the present invention to provide for the utilization of all of the hydrogen chloride entering the system by effectively recovering the major portion of the hydrogen chloride which remains unreacted after the oxidation reaction, and by returning this hydrogen chloride substantially in an anhydrous condition and mixed with oxygen back to the reaction chamber for the production of further quantities of free chlorine. A still further object of the invention is to provide an economical method for removing the excess heat of reaction as well as the water resulting from the oxidation of the hydrogen chloride, such elimination being effected substantially as soon as the water is formed, thereby favoring further chlorine formation and the ultimate recovery of high yields thereof. Another object is to provide a method for the continuous and economical production of high yields of chlorine from hydrogen chloride gas contained in mixtures thereof with organic compounds, and particularly in gaseous mixtures resulting from the above-mentioned high temperature chlor-substitution reactions and/or dehydrochlorination reactions. Still other objects of the invention will be apparent and understood by reference to the following portion of the specification and to the accompanying drawing, which illustrates diagrammatically the various essential and/or desirable parts of an apparatus and their association with each other, it being understood that details such as pumps, etc., which form no part of the invention, or which are obvious to those skilled in the art, are omitted for purposes of clarity.

It has now been discovered that the above and other objects may be attained by employing the method described and claimed herein, the salient features of which include the steps of: scrubbing a gaseous mixture comprising or consisting of organic compounds or the like and hydrogen chloride with a cold aqueous hydrogen chloride solution, the HCl concentration of which is that of its maximum boiling azeotrope, thereby recovering the hydrogen chloride from such gases and obtaining an aqueous solution containing hydrogen chloride in a concentration greater than that of its maximum boiling azeotrope; employing this cold aqueous solution as a scrubbing agent to separate water from the reaction mixtures leaving the "Deacon" converter or converters, this scrubbing being effected under conditions whereby a maximum boiling azeotrope is obtained as a bottom fraction, while a gaseous mixture enriched by the hydrogen chloride evolved by or released from the scrubbing mixture is obtained as the overhead fraction; conveying this gaseous mixture (if necessary with further addition of oxygen) to the same or another oxidation reactor to produce further quantities of free chlorine; and employing the maximum boiling azeotropes of water and hydrogen chloride (as obtained from the aforementioned scrubbing of the reaction products resulting from the above outlined oxidation of hydrogen chloride), preferably after pre-cooling, as the scrubbing liquid to recover the hydrogen chloride from the gaseous mixture entering the system.

According to one specific embodiment of the present process, a mixture of hydrogen chloride and oxygen (employed in volumetric ratios described below) is continuously conveyed through an oxidizing reactor containing the desirable catalyst and maintained at a temperature which is conducive to the desired or preferred degree of conversion of the hydrogen chloride to free chlorine. This temperature is generally between about 385° C. and 435° C., although higher and lower temperatures may also be employed, the temperature varying in part with the hydrogen chloride-oxygen ratio and the space velocity used in the reactor. The reaction mixture leaving the reactor or converter consists of unreacted hydrogen chloride, water vapor, free chlorine and some unreacted oxygen. This mixture is then conveyed continuously through a scrubber or still wherein the mixture is countercurrently or otherwise contacted with a cold aqueous hydrochloric acid solution the hydrogen chloride concentration of which is greater than that of its maximum boiling azeotrope. Their treatment has a dual function: water vapor is condensed and removed from the vaporous reaction mixture in the form of a hydrogen chloride-water maximum boiling azeotrope; simultaneously, the heat imparted to the scrubbing liquid causes the evolution of the excess hydrogen chloride absorbed therein so that only a maximum boiling azeotrope is withdrawn as a liquid from the bottom of the scrubber or still. The hydrogen chloride gas thus evolved, together with the undissolved portion of the reaction mixture (i. e. the unreacted hydrogen chloride, free chlorine and oxygen, if any) is continuously removed from the top of the scrubber and, since it is substantially free from watervapor, may be directly and continuously conveyed through an oxidation reactor for the production of further quantities of free chlorine. The maximum boiling azeotrope withdrawn from the aforementioned scrubber or still, after pre-cooling to any desirable or optimum temperature, is employed as the scrubbing liquid to recover hydrogen chloride from a mixture thereof with saturated and/or unsaturated organic compounds, the resulting cold aqueous solution containing the absorbed hydrogen chloride being then employed to cool further quantities of the gaseous reaction mixture from the oxidizing reactor, this treatment liberating additional absorbed hydrogen chloride to be converted to chlorine.

The repeated recycling of the hydrogen chloride-chlorine mixture (together with the desired or optimum quantities of oxygen) through the same converter, or the consecutive passage of such mixture through a series of converters, together with the removal of the water formed after each pass through a converter, greatly increases the conversion to chlorine, and consequently the concentration thereof in the effluent gases and the overall yield of the desirable chlorine. Also, the use of the aqueous hydrochloric acid solution (i. e. the maximum boiling azeotrope) to extract hydrogen chloride from mixtures thereof with organic compounds, and the contacting of the cold liquid thus formed with the hot reaction products to liberate the absorbed hydrogen chloride in a substantially anhydrous state while removing the water formed in the oxidation converter, greatly enhances the economics of the process, and permits a continuous operation thereof on a commercial scale.

Also, when the catalytic oxidation of hydrogen chloride is effected according to the process of the present invention, it is possible to obtain chlorine concentrations which are considerably higher than those heretofore attainable by operating according to the previously known processes. In fact, the final chlorine concentration of the effluent gases is so high as to render its condensation to liquid chlorine very simple and economical.

To facilitate understanding of the process of the invention, reference is now made to the accompanying drawing which illustrates a suitable method for executing the same. In this drawing, numeral 10 denotes a suitable chamber or converter used for effecting the catalytic oxidation of hydrogen chloride, this converter containing any one or more of the various known oxidation promoting catalysts. The composition and character of this catalyst may vary within wide limits.

It is understood that the efficiency of the catalysts, insofar as their ability to promote the desired oxidation of hydrogen chloride is concerned, is not the same. Also, the optimum operating conditions, such as operating temperature, space velocity and the like, may have to be varied depending on the specific catalyst employed. However, these features are readily understandable, determinable and/or calculable by a chemist skilled in the art to which the present invention (which is not directed to the use of any specific catalyst) pertains.

The selected catalyst being thus disposed in the chamber or converter 10, a mixture of hydrogen chloride and oxygen in the proportions hereinafter described is introduced into this chamber through pipe 11, the oxygen (or an oxygen-containing gas) being fed into the system through pipe 12, while the hydrogen chloride (which after the initiation of the reaction, comes as a mixture thereof with free chlorine) is introduced into pipe 11 through line 13. In order to initiate the operations, hydrogen chloride may be fed into the system through line 14 provided with a valve 15. The vaporous reaction products leaving the reaction chamber 10, and consisting mainly of unreacted hydrogen chloride, water vapor and free chlorine, are passed via pipe 17 into a separator or still 18 wherein water is removed from the reaction vapors in the form of a bottom fraction comprising essentially a maximum boiling water-hydrogen chloride azeotrope. This is effected by contacting or scrubbing the vaporous reaction mixture with a cold aqueous hydrogen chloride solution the hydrogen chloride concentration of which solution is greater than that of its maximum boiling azeotrope. This concentrated solution is fed into the separator or still 18 through pipe 19 provided with a valve 20 and leading from a source to be described below. The cold concentrated solution coming in countercurrent contact with the hot vaporous reaction mixture effects a condensation of the water vapor formed in the converter 10, this condensed water forming a maximum boiling azeotrope with a part of the free chloride present in still 18. Simultaneously, the heating of the cold scrubbing solutions effects a liberation of free chlorine thereof, the operating conditions in still 18 being such that the hydrogen chloride concentration of the solution leaving still 18 via line 22 is essentially that of its maximum boiling azeotrope.

The substantially anhydrous gaseous mixture withdrawn from the upper portion of the still 18 consists essentially of free chlorine (formed during the oxidation reaction), hydrogen chloride and some oxygen. The hydrogen chloride in this mixture includes the fraction which remained unreacted after passage through converter 10, and the hydrogen chloride evolved in still 18 from the cold scrubbing liquid introduced thereinto. This gaseous mixture is conveyed from still 18 via lines 23, 13 and 11 back into converter 10, or via lines 23, 24 and 25 into a second converter 26 which may or may not be similar in construction to the first converter, and which may contain the same or other oxidation promoting catalysts. Prior to reintroduction into converter 10, or the introduction into converter 26, the gaseous mixture is commingled with the necessary or optimum quantities of oxygen which is introduced through lines 12 or 27, respectively.

The reaction mixture leaving converter 26 is enriched by the additional quantities of chlorine formed by the catalytic oxidation of a part of the hydrogen chloride content of the mixture conveyed through the reaction zone. However, the gaseous reaction products still contain unreacted hydrogen chloride and some water formed as a result of the reaction. As in the case with the hot gaseous products withdrawn from reactor 10, those leaving converter 26 are conveyed via pipe 28 into the lower portion of a still 29 wherein they are again contacted or scrubbed with a cold aqueous hydrogen chloride solution the hydrogen chloride concentration of which is greater than that of its maximum boiling azeotrope. This solution enters still 29 through line 30 provided with valve 31, and may or may not be of the same composition as the solution introduced into still 18 via line 19. The selective scrubbing or extractive distillation occurring in still 29 produces a hydrogen chloride-water maximum boiling azeotrope which is withdrawn from the bottom via line 34, and a gaseous mixture containing free chlorine and hydrogen chloride, this mixture leaving the top of the still via line 35. This gaseous mixture may be again repeatedly recycled (with cooling and water removal after each passage through a converter) until the desired chlorine concentration is attained.

From what was said above, it is seen that the invention provides a process whereby the chlorine concentration may be increased until a desired or optimum limit has been attained. For instance, as noted above, the gases from line 35 may be conveyed via valved line 36 back into converter 26 or to still another converter wherein further oxidation of the hydrogen chloride to free chlorine may be effected. Therefore, the invention is not limited to the use of only two oxidation reaction zones or to the recycling through a single converter.

When the free chlorine in the effluent gases leaving still 29 has reached a desired or optimum concentration, these gases may be treated to recover the free chlorine therefrom. In the specific embodiment presented in the drawing, this is effected by opening valve 38 and conveying the gases via pipe 39 into a scrubber 40 wherein the gases are treated, for example, with water introduced via pipe 41. The aqueous hydrochloric acid solution is withdrawn through line 42, while substantially pure chlorine is withdrawn to suitable storage via line 43. Instead of conveying all of the vapors or gases from still 29 into chlorine separator 40, the process may be made continuous by passing a portion of the gases to this chlorine separator, while the remaining gases may be subjected to further oxidation in any reaction chambers of the type of converters 10, 26, or the like. This splitting of the vaporous stream may be effected by suitable regulation of the valves in lines 36 and 39. Other methods of separating the free chlorine from mixtures thereof with hydrogen chloride may also be employed.

The hydrogen chloride-water maximum boiling azeotrope withdrawn from the lower portions of stills 18 and 29 is conveyed via pipes 22 and 34 to a cooler 46 wherein the azeotrope is chilled by any of the well-known methods. The cold solution is then passed via line 47 into scrubber 48 wherein it comes in contact with a stream of gases containing hydrogen chloride (such as a gaseous mixture comprising hydrocarbons and hydrogen chloride) introduced into the scrubber via pipe 49. The cold azeotropic solution selectively dissolves the hydrogen chloride, so that the gases leaving the scrubber via pipe 50 are substantially free therefrom. If desired, these gases (or any portion thereof) may be recycled via valved line 51 so as to effect a complete or substantially complete separation of the hydrogen chloride therefrom. The cold solution leaving the bottom of scrubber 48 via line 52 thus contains a hydrogen chloride concentration which is greater than that of its maximum boiling azeotrope. It is this solution which is employed as the scrubbing agent introduced via pipes 19 and 30 into stills 18 and 29, respectively, this solution effecting the removal of water from the hot effluent gases coming from the oxidation chambers, and simultaneously giving off the hydrogen chloride extracted from the gases in scrubber 48.

Due to the fact that water is formed as a product of the hydrogen chloride oxidation reaction the continued operation of the above outlined process will cause a gradual increase in the volume of the aqueous hydrochloric acid solution. Therefore a portion of such solution may be continuously or intermittently withdrawn from line 47 via pipe 55 provided with a control valve 56, and delivered to a dehydrator 57. Entering the dehydrator, which may consist of a tower containing trays, rings or other means to increase the surface extension of the liquid, the hydrochloric acid solution comes in contact with strong sulfuric acid introduced through a pipe 58 into the upper portion of the dehydrator. The contact between the sulfuric acid and aqueous hydrochloric acid solutions results in the removal of water from the hydrogen chloride so that a substantially anhydrous hydrogen chloride may be withdrawn from the dehydrator through line 59. This hydrogen chloride may, for example, be conveyed into line 13, from which, after commingling with oxygen, it is conveyed to the catalytic converter 10 for the manufacture of additional quantities of free chlorine. The aqueous sulfuric acid solution is withdrawn from the bottom of the dehydrator 57, through line 61. This solution, if desired, may be concentrated by any of the well-known means and then recycled back into the dehydrator through line 58 to remove the water from further quantities of hydrochloric acid solutions conveyed into the dehydrator 57 through line 55. Other methods of dehydrating the excess hydrochloric acid solution, for example, by means of calcium chloride, etc., may also be used.

The above outlined process favors the catalytic oxidation of hydrogen chloride to free chlorine. This is due to the fact that the removal of water formed during the described oxidation reaction shifts the equilibrium of the essential reaction of the Deacon process to favor more chlorine formation. In accordance with the process of the present invention the water formed in each of the converters is removed from the effluent gases substantially as soon as formed by utilizing the azeotropic properties of aqueous hydrochloric acid. In accordance with the process the reaction mixture formed in the oxidation reaction is quickly conveyed to a still (e. g. still 18) and scrubbed with a cold concentrated hydrochloric acid solution to remove the water in the form of the maximum boiling azeotrope. The remaining gases may then be again conveyed through the same or another converter, wherein further oxidation of the hydrogen chloride to chlorine is effected. To readjust the composition of the gas, additional quantities of oxygen may be added before such recycling. Operations in accordance with the described process thus provide for an efficient removal of heat and water, thereby favoring chlorine production. In fact, by effecting the catalytic oxidation in a series of successive steps or by recycling through the same reaction zone and by removing the produced water between such oxidation steps or substantially immediately after the passage of the gases through the converter, the catalytic oxidation of the hydrogen chloride to free chlorine may be carried substantially to completion.

The process also provides for a continuous recovery of hydrogen chloride from gases containing the same, and the use of a cold concentrated solution of such hydrogen chloride to remove the water formed in the catalytic oxidation chambers, the hydrogen chloride in excess of that of the aqueous maximum boiling azeotrope being readily and simultaneously evolved in a substantially anhydrous condition so that it may be employed as a starting material for the production of additional quantities of free chlorine. In this connection it must be noted that the degree of cooling of the maximum boiling azeotrope in cooler 46, as well as the rate of throughput of such azeotrope through scrubber 48 should be regulated so as to attain proper or complete recovery of hydrogen chloride from the gaseous mixture introduced into the system through line 49. Also, the temperature of the resulting concentrated hydrochloric acid solution, its hydrogen chloride concentration, as well as the ratio thereof to the hot effluent gases in the stills, such as still 18, should be controlled so as to effect the desired vaporization of excess hydrogen chloride from such solution and the separation of the water formed in the converters as a maximum boiling azeotrope with hydrogen chloride.

Although the process of the present invention has been described with particular reference to the catalytic oxidation using oxygen as the oxidizing agent, it is to be understood that other oxygen-containing gases, such as air, may also be employed. In such cases it is advisable to provide means for the continuous or intermittent separation of the inert fractions, e. g., nitrogen, from the reaction mixture.

I claim as my invention:

1. In a method of producing chlorine by the oxidation of hydrogen chloride, the steps of conveying a gaseous mixture containing hydrogen chloride and oxygen through a reaction zone containing a catalyst which promotes the oxidation of hydrogen chloride to chlorine, maintaining said mixture in contact with the catalyst under oxidizing conditions for a period of time insufficient for the reactants and the reaction products to come to an equilibrium, scrubbing the effluent hot gases containing free chlorine, water vapor and unreacted hydrogen chloride with a cold concentrated aqueous hydrochloric acid solution having a hydrogen chloride concentration substantially greater than that of its maximum boiling azeotrope, said scrubbing solution being produced by the absorption of hydrogen chloride from a gaseous mixture of hydrogen chloride and an organic compound, its concentration, temperature and relative amount being such that the effluent hot gas mixture is cooled to a temperature below its dew point, such that there is produced a liquid fraction comprising a water-hydrogen chloride maximum boiling azeotrope and an overhead gaseous fraction comprising a substantially anhydrous mixture of free chlorine and hydrogen chloride, separately cooling the maximum boiling azeotrope, contacting said cold azeotrope with a gaseous mixture containing organic compounds and hydrogen chloride to form an aqueous solution having a hydrogen chloride concentration greater than that of its maximum boiling azeotrope, using this solution as the above scrubbing solution for the hot effluent gases from the catalytic oxidation reaction zone, re-subjecting at least a portion of the substantially anhydrous overhead fraction obtained from the scrubbing of the effluent gases to the above-described steps of catalytic oxidation and scrubbing of the resultant hot effluent gases to maintain a high chlorine concentration in the overhead gaseous fraction, and separating chlorine from the overhead gaseous fraction.

2. A continuous process for the production of chlorine by the catalytic oxidation of hydrogen chloride which comprises establishing a plurality of reaction zones containing a catalyst which promotes the oxidation of hydrogen chloride to chlorine, conveying a gaseous mixture containing oxygen and hydrogen chloride through the first of said reaction zones maintained under oxidizing conditions to produce hot effluent gases containing free chlorine, water vapor and unreacted hydrogen chloride, continuously scrubbing the hot effluent gases with a cold concentrated hydrochloric acid solution having a hydrogen chloride concentration substantially greater than that of its maximum boiling azeotrope, said scrubbing solution being produced by the absorption of hydrogen chloride from a gaseous mixture of hydrogen chloride and an organic compound, its concentration, temperature and relative amount being such that the effluent hot gas mixture is cooled to a temperature below its dew point, such that there is produced a liquid fraction comprising a water-hydrogen chloride maximum boiling azeotrope and an overhead gaseous fraction comprising a substantially anhydrous mixture of free chlorine and hydrogen chloride, using the liquid fraction as the above scrubbing solution continuously and successively conveying the overhead gaseous fraction together with oxygen through the succeeding reaction zones maintained under oxidizing conditions, while scrubbing the hot effluent gases from each of said zones with the aforementioned cold concentrated hydrochloric acid solution to form the overhead fraction for the next succeeding reaction zone, thereby producing a gaseous fraction containing a high chlorine concentration, and separating chlorine from the overhead gaseous fraction.

3. In a method of producing chlorine by the oxidation of hydrogen chloride, the steps of conveying a gaseous mixture containing hydrogen chloride and oxygen through a reaction zone containing a catalyst which promotes the oxidation of hydrogen chloride to chlorine, maintaining said reactants in the reaction zone under oxidizing conditions to produce hot effluent gases containing free chlorine, water vapor and unreacted hydrogen chloride, scrubbing the hot effluent gases with a cold concentrated aqueous hydrochloric acid solution having a hydrogen chloride concentration substantially greater than that of its maximum boiling azeotrope, said scrubbing solution being produced by the absorption of hydrogen chloride from a gaseous mixture of hydrogen chloride and an organic compound, its concentration, temperature and relative amount being such that the effluent hot gas mixture is cooled to a temperature below its dew point, such that there is produced a liquid fraction comprising a water-hydrogen chloride maximum boiling azeotrope and an overhead gaseous fraction comprising a substantially anhydrous mixture of free chlorine and hydrogen chloride, separately cooling the maximum boiling azeotrope, contacting said cold azeotrope with a gaseous mixture containing organic compounds and hydrogen chloride to form an aqueous solution having a hydrogen chloride concentration greater than that of its maximum boiling azeotrope, using this solution as the above scrubbing solution for the hot effluent gases from the catalytic oxidation reaction zone, re-subjecting at least a portion of the substantially anhydrous overhead fraction obtained from the scrubbing of the effluent gases to the above-described steps of catalytic oxidation and scrubbing of the resultant hot effluent gases to maintain a high chlorine concentration in the overhead gaseous fraction, and separating chlorine from the overhead gaseous fraction.

4. In a method of producing chlorine by the oxidation of hydrogen chloride, the steps of conveying a gaseous mixture containing hydrogen chloride and oxygen through a reaction zone containing a catalyst which promotes the oxidation of hydrogen chloride to chlorine, maintaining said mixture in contact with the catalyst under oxidizing conditions for a period of time insufficient for the reactants and reaction products to come to an equilibrium, scrubbing the hot effluent gases containing free chlorine, water vapor and unreacted hydrogen chloride with a cold concentrated aqueous hydrochloric acid solution having a hydrogen chloride concentration substantially greater than that of its maximum boiling azeotrope, said scrubbing solution being produced by the absorption of hydrogen chloride from a gaseous mixture of hydrogen chloride and an organic compound, its concentration, temperature and relative amount being such that the effluent hot gas mixture is cooled to a temperature below its dew point, such that there is produced a liquid fraction comprising a water-hydrogen chloride maximum boiling azeotrope and an overhead gaseous fraction comprising a substantially anhydrous mixture of free chlorine and hydrogen chloride, using the liquid fraction as the above scrubbing solution, re-subjecting at least a portion of this overhead fraction to the above-described steps of catalytic oxidation and scrubbing of the hot effluent gases to maintain a high concentration of the chlorine in the overhead gaseous fraction, and separating chlorine from the overhead gaseous fraction.

5. In a method of producing chlorine by the oxidation of hydrogen chloride, the steps of conveying a gaseous mixture containing hydrogen chloride and oxygen through a reaction zone containing a catalyst which promotes the oxidation of hydrogen chloride to chlorine, maintaining said reactants in the reaction zone under oxidizing conditions to produce hot effluent gases containing free chlorine, water vapor and unreacted hydrogen chloride, scrubbing the hot effluent gases with a cold concentrated aqueous hydrochloric acid solution having a hydrogen chloride concentration substantially greater than that of its maximum boiling azeotrope said scrubbing solution being produced by the absorption of hydrogen chloride from a gaseous mixture of hydrogen chloride and an organic compound, its concentration, temperature and relative amount being such that the effluent hot gas mixture is cooled to a temperature below its dew point such that there is produced a liquid fraction comprising a water-hydrogen chloride maximum boiling azeotrope and an overhead gaseous fraction comprising a substantially anhydrous mixture of free chlorine and hydrogen chloride, using the liquid fraction as the above scrubbing solution, re-subjecting a portion of this overhead fraction to the above-described steps of catalytic oxidation and scrubbing of the resultant hot effluent gases to maintain a high concentration of the chlorine in the overhead gaseous fraction, and recovering chlorine from the products.

6. The method according to claim 5, wherein the chlorine is recovered from the overhead gaseous fraction which is not re-subjected to the aforesaid catalytic oxidation.

7. In a method of producing chlorine by the oxidation of hydrogen chloride, the steps of reacting hydrogen chloride with oxygen, at an elevated temperature and in the presence of a catalyst which promotes the oxidation of the hydrogen chloride to chlorine, scrubbing the resulting hot effluent gases containing free chlorine, water vapor and unreacted hydrogen chloride with a cold concentrated aqueous hydrochloric acid solution having a hydrogen chloride concentration substantially greater than that of its maximum boiling azeotrope, said scrubbing solution being produced by the absorption of hydrogen chloride from a gaseous mixture of hydrogen chloride and an organic compound, its concentration, temperature and relative amount being such that the effluent hot gas mixture is cooled to a temperature below its dew point, such that there is produced a liquid fraction comprising a water-hydrogen chloride maximum boiling azeotrope and an overhead gaseous fraction comprising a substantially anhydrous mixture of free chlorine and hydrogen chloride, using the liquid fraction as the above scrubbing solution, and recovering the chlorine in the overhead gaseous fraction.

LUDWIG ROSENSTEIN.